United States Patent [19]

Just et al.

[11] Patent Number: 5,120,838
[45] Date of Patent: Jun. 9, 1992

[54] ALKYLARYL HYDROPHOBICALLY MODIFIED CELLULOSE ETHERS

[75] Inventors: Ernst K. Just, Wilmington, Del.; Thomas G. Majewicz, Kennett Square, Pa.; Arjun C. Sau, Newark, Del.

[73] Assignee: Aqualon Company, Wilmington, Del.

[21] Appl. No.: 428,912

[22] Filed: Oct. 30, 1989

[51] Int. Cl.$^5$ .............. C08B 11/08; C08B 11/16; C08B 11/187; C08B 11/193

[52] U.S. Cl. .................. 536/90; 536/93; 536/94; 536/96

[58] Field of Search .......... 536/84, 90, 93, 95, 536/96, 94, 111; 524/47

[56] References Cited

U.S. PATENT DOCUMENTS

| | | | |
|---|---|---|---|
| 1,451,331 | 4/1923 | Dreyfus | 536/84 |
| 3,102,912 | 9/1963 | Neracher et al. | 564/5 |
| 4,009,329 | 2/1977 | Arney et al. | 536/84 |
| 4,084,060 | 4/1978 | Glass et al. | 536/96 |
| 4,228,277 | 10/1980 | Bandoll | 536/90 |
| 4,243,802 | 1/1981 | Landoll | 536/91 |
| 4,663,159 | 5/1987 | Brode, II et al. | 424/70 |
| 4,684,704 | 8/1987 | Craig | 526/200 |
| 4,703,116 | 10/1987 | Solarek et al. | 536/111 |
| 4,731,162 | 3/1988 | Solarek et al. | 536/111 |
| 4,845,175 | 7/1989 | Lo | 526/200 |

FOREIGN PATENT DOCUMENTS 0384167  8/1990  European Pat. Off. .

Primary Examiner—Nathan M. Nutter
Attorney, Agent, or Firm—James K. Luchs

[57] ABSTRACT

Cellulose ethers are disclosed which have sufficient nonionic substitution to render them water soluble and which are further modified with a $C_{10}$ to $C_{24}$ long chain alkylaryl group in an amount between 0.2% by weight and the amount which makes them less then 1% by weight soluble in water. Hydroxyethylcellulose is a preferred water soluble cellulose ether for modification according to the invention. These products exhibit substantially improved viscosifying effects compared to their unmodified cellulose ether counterparts, and provide good leveling and sag resistance in latex paints. Preferred alkylaryl groups are nonylphenyl, dodecylphenyl, and dinonylphenyl. Included are cellulose ethers with spacer groups of various lengths between the alkylaryl group and the connecting group to the cellulose molecule.

5 Claims, No Drawings

ALKYLARYL HYDROPHOBICALLY MODIFIED CELLULOSE ETHERS

FIELD OF THE INVENTION

This invention relates to a new class of modified water soluble polymers. Specifically it relates to alkylaryl hydrophobically modified hydroxyethylcellulose, methylcellulose and hydroxypropylcellulose.

BACKGROUND OF THE INVENTION

Nonionic water soluble cellulose ethers are employed in a wide variety of industrial applications, as thickeners, as water retention aids, and as suspension aids in certain polymerization processes, among others. Widely used, commercially available, nonionic cellulose ethers include methylcellulose, hydroxypropylmethylcellulose, hydroxyethylcellulose, hydroxyethylpropylcellulose, hydroxypropylcellulose, and ethylhydroxyethylcellulose.

As is generally the case with high polymers, better thickening efficiency is realized with higher molecular weight cellulose ethers. U.S. Pat. Nos. 4,228,277 and 4,243,802 (Landoll) disclose nonionic cellulose ethers of relatively low molecular weight which are capable of producing viscous aqueous solutions in practical concentrations. U.S. Pat. No. 4,845,175 discloses alkylaryl hydrophobically modified hydroxyethylcellulose as a useful material for emulsion polymerization, but contains no disclosure of how to make or use the compounds of the present invention. These products exhibit a relatively high degree of surface activity compared to that of more conventional nonionic water soluble cellulose ethers. These products are nonionic cellulose ethers which are modified by substitution with specified amounts of $C_{10}$ to $C_{24}$ alkyl radicals. Such ethers are substituted with an amount of long chain alkyl hydrocarbon radical between about 0.2 weight percent and the amount which renders said cellulose ether less than 1% by weight soluble in water. The base cellulose ether thus modified is preferably one of low to medium molecular weight, i.e., less than about 800,000 and preferably between 20,000 and 500,000, or a Degree of Polymerization (D.P.) of about 75 to 1,800.

Modification of the cellulose ethers with small hydrophobic groups such as ethyl, benzyl and phenylhydroxyethyl groups were not found to effect the property improvements shown by the long chain alkyl hydrophobic modifications. The long chain alkyl cellulose ethers disclosed were useful as stabilizers in emulsion polymerizations, as thickeners in cosmetics, and as flocculants in mineral processing. One particularly good utility was as a thickener in latex paint, where very small amounts of low molecular weight long chain alkyl modified nonionic cellulose ethers outperformed larger quantities of higher molecular weight conventional nonionic cellulosic ethers. The advantages of these products in this particular use are discussed in detail in the Aqualon publication entitled "Natrosol® Plus-Modified Hydroxyethylcellulose-Performance as a Latex Paint Thickener." Specifically, they provide improved paint rheology, excellent spatter resistance, and good thickening efficiency in a wide variety of latex paint formulations. Paint leveling properties are adequate and better than those obtained with the unmodified base polymer from which they were prepared. However, further improvement in leveling properties would be desirable.

SUMMARY OF THE INVENTION

It is the object of this invention to provide a new class of hydrophobically modified cellulose ethers which give, among other applications, significantly better leveling properties in latex paint formulations than those obtained with the long chain alkyl substituted cellulose ethers of the two previously mentioned patents, without sacrificing the other good performance properties in latex paint applications. This has been achieved by the use of nonionic cellulose ethers having a sufficient degree of nonionic substitution selected from the class consisting of methyl, hydroxyethyl and hydroxypropyl which would cause them to be water soluble, and which are further substituted with alkylaryl hydrocarbon radicals having about 10 to 24 carbon atoms in an amount between about 0.2 weight percent and the amount which renders said cellulose ether less than 1 percent by weight soluble in water. The cellulose ether to be modified is preferably one of low to medium molecular weight, i.e. less than about 800,000 and preferably about 20,000 and 500,000 (about 75 to 1,800 D.P.) Examples of such alkylaryl modified cellulose ethers are hydroxyethylcelluloses modified with either nonylphenyl, dodecylphenyl, or dinonylphenyl alkylaryl groups containing alkylaryl substitution levels from 0.25 to 2.4 weight percent.

While any nonionic water soluble cellulose ether can be employed as a cellulose ether substrate used to form the products of this invention, the preferred cellulose ether substrate is hydroxyethylcellulose of about 50,000–400,000 molecular weight. The alkylaryl substituent can be attached to the cellulose ether substrate via an ether, ester or urethane linkage. Preferred is the ether linkage, as the reagents currently used to effect etherification are readily obtained, the reaction is similar to that commonly used for the initial etherification, and the reagents are more easily handled than the reagents employed for modification via the other linkages. The resulting linkage is also usually more resistant to further reactions.

DETAILED DESCRIPTION OF THE INVENTION

Although the products of this invention are referred to as being "long chain alkylaryl group modified," it will be recognized that except in the case where modification is effected with an alkyl halide, the modifier is not a simple long chain alkylaryl group. The group is actually a hydroxyalkyl radical in the case of a glycidyl ether, a urethane radical in the case of an isocyanate, or an acyl radical in the case of an acid or acyl chloride. Nonetheless, the terminology "long chain alkylaryl group" is used and the number of carbon atoms referes only to those carbon atoms in the hydrocarbon portion of the modifying molecule. It does not include any carbon atoms in the connecting groups. Thus, hydroxyethylcellulose modified by reaction with nonylphenyl glycidyl ether is termed a $C_{15}$ hydrophobic group ($C_6 + C_9$) modification of hydroxyethylcellulose.

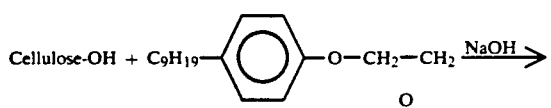

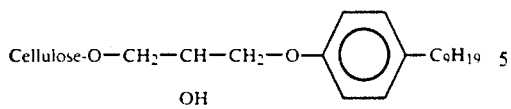

Similar modifications using ether dodecylphenyl glycidyl ether or dinonylphenyl glycidyl ether would result in $C_{18}$ and $C_{24}$ hydrophobes, respectively.

Moreover, there may be additional spacer groups, of various lengths, between the standard connecting group mentioned above and the long chain alkylaryl group. Thus, products with the structure:

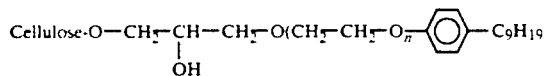

have been prepared, where the hydrophobe group is still considered to be $C_{15}$.

Methods of preparing mixed ethers of cellulose, i.e., products having more than one etherifying modifier attached to the same cellulose molecule are known to the art. The products of this invention can be prepared via essentially the same methods. The preferred procedure for preparing the mixed ethers of this invention comprises slurrying the nonionic cellulose ether in an inert organic diluent with alkali until swollen, and reacting with about a $C_{10}$ to $C_{24}$ alkylaryl glycidyl ether, with agitation and heat, until the reaction is complete. Residual alkali is then neutralized, and the product is recovered, washed with inert diluents, and dried. The etherification can also be effected with a $C_{10}$ to $C_{24}$ halide, but these are sometimes less reactive, less efficient and more corrosive. Therefore, it is preferred to use the glycidyl ether.

Methods of preparation of alkyl hydrophobically modified cellulose ethers are described in U.S. Pat. No. 4,228,277. In addition, rather than isolating and reacting the dried cellulose ether with the alkylaryl glycidyl ether, it is also possible to conduct the reaction in situ, that is, immediately after the preparation of the base cellulose ether of the proper substitution level, without isolating the cellulose ether. In this variation, the alkylaryl glycidyl ether is added immediately upon completion of the preparation of the cellulose ether, e.g., hydroxyethylcellulose. The reaction mixture is then reacted at an appropriate temperature and time for the reaction to be completed. In both methods of preparation, it is necessary that conditions be provided to assure that the cellulose ether is swollen to the point that the modifier can react substantially uniformly on all cellulose ether molecules throughout.

The following examples illustrate the practice of this invention, which has industrial application in latex paint manufacture.

EXAMPLES 1 TO 6

Nonylphenyl Glycidyl Ether (NPGE)

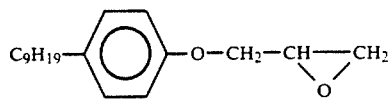

The nonylphenyl glycidyl ether used is a commercial product of Wilmington Chemical Company (Heloxy® WC-64; 90% pure).

Reaction of NPGE with Hydroxyethylcellulose

Hydroxyethylcellulose was prepared by methods described in U.S. Pat. No. 4,084,060 in a 0.5 gallon CHEMCO stirred autoclave from 121.5 g cellulose; 1,600 ml t-butyl alcohol; 38.9 g sodium hydroxide in 152 ml of water; and 158 g ethylene oxide, at 80° C. Without cooling the reactor, nonylphenyl glycidyl ether (NPGE) dissolved in 20 ml t-butyl alcohol was added and the reactor heated to 110° C. The mixture was kept at 110° C. for 2 hours. The reactor was then cooled to below 40° C. and neutralized to a pH of 7-8. The product was purified by slurrying in 85% aqueous acetone, filtering, reslurrying in 100% acetone, filtering and drying in a laboratory fluid bed dryer. The products were cream colored solids.

Analytical data are given in Table 1.

TABLE 1

| | | Product Data | | | |
|---|---|---|---|---|---|
| Example No. | Grams of nonylphenyl glycidyl ether added | Weight % nonylphenyl modifier | Hydroxy-ethyl M.S. | 1% Brookfield Viscosity (mPa · s) | % Ash as $Na_2SO_4$ |
| Control A | 0 | 0 | 4.1 | 44 | 6.5 |
| Control B | 0 | 0 | 5.2 | 40 | 5.4 |
| 1 | 9 | 0.61 | 4 | 120 | 6.2 |
| 2 | 18 | 0.94 | 3.1 | 175 | 5.0 |
| 3 | 18 | 1.12 | 4 | 352 | 5.6 |
| 4 | 18 | 1.2 | 5.2 | 250 | 5.6 |
| 5 | 26 | 1.63 | 3.1 | 2120 | 5.3 |
| 6 | 26 | 2.42 | 5.2 | 2180 | 5.3 |

Table 1 illustrates the associative thickener characteristics of alkylaryl hydrophobically modified cellulose ethers to provide enhanced viscosity.

EXAMPLES 7 TO 13

Dodecylphenyl Glycidyl Ether (DDPGE)

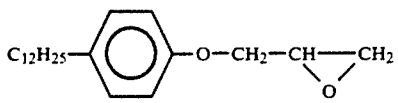

The dodecylphenyl glycidyl ether was prepared by a procedure described in U.S. Pat. No. 3,102,912. DDPGE was 80% pure and contained predominately the para isomer.

Dinonylphenyl Glycidyl Ether (DNPGE)

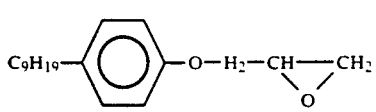

The dinonylphenyl glycidyl ether was prepared by a procedure described in *Synthesis*, February 1983, pp. 117-119. DNPGE was 99% pure and contained predominately the ortho-para isomer.

Poly(ethyleneoxy)nonylphenyl$_9$ Glycidyl Ether (PEONPGE)

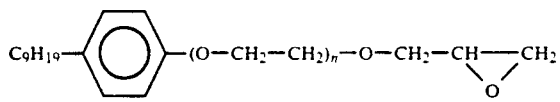

The poly(ethyleneoxy)nonylphenyl glycidyl ether was prepared in the same manner as dinonylphenyl glycidyl ether except that poly(ethyleneoxy)$_9$nonylphenol (Igepal CO630 from GAF) was used instead of dinonylphenol. PEONPGE was 90% pure.

Reaction of DDPGE, DNPGE or PEONPGE with Hydroxyethylcellulose

The dodecylphenyl glycidyl ether (DDPGE) or the dinonylphenyl glycidyl ether (DDPGE) was reacted with hydroxyethylcellulose prepared using the same amounts of ingredients described in examples 1 to 6, except for the amount of alkylaryl glycidyl ether. Poly(ethyleneoxy)$_9$nonylphenyl glycidyl ether (PEONPGE), 2.1 g, was reacted with 34.5 g HEC, prepared according to examples 1 to 6, in the presence of 250 ml tert-butyl alcohol (TBA), and 3.6 g sodium hydroxide in 27 g water, at 90° C. for 4½ hours. Neutralization and product workup were similar to the procedures described for examples 1 to 6.

The amounts of the glycidyl ethers used and analyses of the products isolated are shown in Table 2.

TABLE 2

| Example No. | Grams of phenyl glycidyl ether added | Weight % Phenyl glycidyl ether modifier | Hydroxy ethyl M.S. | 1% Brookfield Viscosity (mPa · s) | % Ash as Na$_2$SO$_4$ |
|---|---|---|---|---|---|
| A. Dodecylphenyl glycidyl ether ||||||
| 7 | 9.0 | 0.51 | 4.0 | 63 | 4.9 |
| 8 | 13.57 | 0.78 | 3.9 | 230 | 5.4 |
| 9 | 18.2 | 1.00 | 4.0 | 550 | 5.1 |
| B. Dinonylphenyl glycidyl ether ||||||
| 10 | 12.0 | 0.25 | 4.1 | 56 | 4.0 |
| 11 | 18.2 | 0.46 | 4.1 | 135 | 4.9 |
| 12 | 25.0 | 0.62 | 4.1 | 300 | 3.6 |
| C. Poly (ethyleneoxy)$_9$ nonylphenyl glycidyl ether ||||||
| 13 | 2.1 g/ 34.5 g HEC | ~0.5 | 4.5 | 44 | — |

EXAMPLES 14 TO 27

The products of examples 1 to 13 were used in a semi-gloss white interior acrylic latex paint formulation (formulation 3; SG-41-3; Aqualon Company Natrosol ® Plus booklet, page 16), substituting these products for the Natrosol ® Plus Thickener used in the formulation.

Details of the paint properties resulting are given in Table 3. All paints were thickened to a Stormer viscosity of about 90 K.U. Performance parameters are described in the Aqualon Company Natrosol ® Plus booklet.

TABLE 3

| Example No. | Thickener Sample | Brushing Viscosity (poises) | Spatter | Leveling | Sag Resistance (mils) | 60° Gloss |
|---|---|---|---|---|---|---|
| A. Nonylphenyl Modifier |||||||
| 14 | 1 | 1.3 | 5 | 9 | 10 | 33.9 |
| 15 | 2 | 1.1 | 6 | 10 | 12 | 36.0 |
| 16 | 3 | 1.0 | 7 | 9 | 17 | 33.5 |
| 17 | 4 | 1.1 | 8 | 9 | 13 | 26.2 |
| 18 | 5 | 0.8 | 7 | 7 | 16 | 37.4 |
| 19 | 6 | 1.0 | 5 | 3 | 24 | 17.8 |
| B. Dodecylphenyl Modifier |||||||
| 20 | 7 | 1.2 | 8 | 9 | 11 | 39.8 |
| 21 | 8 | 1.0 | 8 | 8 | 13 | 40.2 |
| 22 | 9 | 1.0 | 8 | 5 | 19 | 40.0 |
| C. Dinonylphenyl Modifier |||||||
| 23 | 10 | 1.2 | 9 | 9 | 10 | 39.8 |
| 24 | 11 | 1.0 | 8 | 8 | 12 | 38.9 |
| 25 | 12 | 0.8 | 8 | 8 | 12 | 39.1 |
| D. Poly(ethyleneoxy)$_9$ nonylphenyl Modifier |||||||
| 26 | 13 | 1.2 | 6 | 9 | 10 | — |
| E. Control (Natrosol ® Plus) (Long Chain Alkyl Modifier) |||||||

TABLE 3-continued

| Example No. | Thickener Sample | Brushing Viscosity (poises) | Spatter | Leveling | Sag Resistance (mils) | 60° Gloss |
|---|---|---|---|---|---|---|
| 27 | | 1.1 | 9 | 5 | 20 | 31.0 |

Several unusual effects have been observed to be caused by the products of this invention in latex paint formulations. Relative to a thickener comprised of a long chain alkyl hydrocarbon modifier such as the group in Natrosol® Plus, these alkylaryl modified HEC thickeners showed significantly better leveling properties in paint, with values of 8-10 (compared to a value of 5 for Natrosol® Plus). When the alkylaryl group was nonylphenyl, the paint leveling value increased as the amount of hydrophobic substitution increased, up to a nonylphenyl substitution value of about 1.5 weight percent. At higher amounts of substitution, paint leveling values decreased. Thus, optimum paint leveling was achieved with nonylphenyl substitution amounts of between 0.5 and 1.5 weight percent. Other paint properties such as spatter resistance, brushing viscosity, and gloss were comparable to those obtained with the long chain hydrocarbon alkyl modifier. Sag resistance properties were slightly poorer as the result of the better leveling properties; however, sag values were still within acceptable limits.

In addition, other alkylaryl modifiers, such as dodecylphenyl ($C_{18}$) and dinonylphenyl ($C_{24}$) also gave excellent leveling and sag resistance properties—as did cellulose ethers with a long spacer group between the alkylaryl hydrophobic group and a standard connecting group, as in the cellulose ether with a poly(ethyleneoxy)$_9$nonylphenyl modifier.

EXAMPLE 28

Thickener sample Number 3 from Table 1 was used in a vinyl acetate/vinyl versatate latex paint formulation. A leveling rating of 6 was obtained, compared to a rating of 3 for Natrosol® Plus.

This example illustrates an improvement in leveling by use of an alkylaryl modified hydroxyethylcellulose, relative to Natrosol® Plus in a different type of latex paint.

What is claimed is:

1. An arylalkyl hydrophobically modified hydroxyethylcellulose useful as an associative thickener in an aqueous protective coating, characterized in that the arylalkyl hydrophobically modified hydroxyethylcellulose provides a leveling value of at least 7 and a sag value of at least 12 and a Stormer Viscosity of at least 85 KU.

2. The arylalkyl hydrophobically modified hydroxyethylcellulose of claim 1 where the arylalkyl group is one of the group of nonylphenyl, dodecylphenyl, dinonylphenyl and poly(ethyleneoxy)nonylphenyl.

3. The arylalkyl hydrophobically modified hydroxyethylcellulose of claim 2 having a molecular weight of 20,000 to 400,000.

4. The arylalkyl hydrophobically modified hydroxyethylcellulose of claim 3 having a hydroxyethyl Molar Substitution (M.S.) of 3.0 to 4.5.

5. The arylalkyl hydrophobically modified hydroxyethylcellulose of claim 3 where the arylalkyl substitution ranges from 0.4 to 1.5 weight percent.

* * * * *